United States Patent [19]

Masuda et al.

[11] Patent Number: 4,745,284

[45] Date of Patent: May 17, 1988

[54] INFRARED RAY DETECTOR

[75] Inventors: Noboru Masuda, Kawaguchi; Kenji Tomaki, Kawasaki; Tetsuo Oosawa, Tokyo; Michihiro Murata, Kyoto, all of Japan

[73] Assignee: Murata Manufacturing Co., Ltd., Kyoto, Japan

[21] Appl. No.: 866,641

[22] Filed: May 27, 1986

[30] Foreign Application Priority Data

| | | | |
|---|---|---|---|
| May 27, 1985 | [JP] | Japan | 60-115116 |
| Feb. 12, 1986 | [JP] | Japan | 61-29827 |
| Mar. 11, 1986 | [JP] | Japan | 61-54398 |

[51] Int. Cl.[4] .................... G01J 5/08

[52] U.S. Cl. .................... 250/338.3; 250/342; 250/349; 250/353; 340/567

[58] Field of Search .................... 250/338 PY, 342, 349, 250/353; 340/567

[56] References Cited

U.S. PATENT DOCUMENTS

| | | | |
|---|---|---|---|
| 3,703,718 | 11/1972 | Berman | 340/567 |
| 3,839,640 | 10/1974 | Rossin | 250/353 |
| 3,855,474 | 12/1974 | Ward | 250/349 |
| 4,523,095 | 6/1985 | Keller-Steinbach | 250/349 |
| 4,703,171 | 10/1987 | Kahl et al. | 250/221 |

FOREIGN PATENT DOCUMENTS

| | | | |
|---|---|---|---|
| 32131 | 2/1983 | Japan . | |
| 0058425 | 4/1983 | Japan | 250/338 PY |
| 13449 | 4/1985 | Japan . | |
| 2105460 | 3/1983 | United Kingdom | 250/338 PY |

*Primary Examiner*—Janice A. Howell
*Assistant Examiner*—Constantine Hannaher
*Attorney, Agent, or Firm*—Armstrong, Nikaido, Marmelstein & Kubovcik

[57] ABSTRACT

A pyroelectric infrared ray detector of the so-called dual structure for detecting an intruder or the like through differential output of two pyroelectric infrared ray detecting elements connected in parallel or series to each other. The infrared ray detector comprises a pair of pyroelectric infrared ray detecting elements having substantially identically directed light receiving surfaces and electrically connected to each other and a shield member arranged in front of the said light receiving surfaces to partially shield the infrared ray detecting elements against incidence of infrared light. The shield member is arranged in a plane extending between the infrared ray detecting elements to separate the same on both sides thereof.

19 Claims, 12 Drawing Sheets

INFRARED RAY DETECTOR

BACKGROUND OF THE INVENTION

1. Field of the Invention

The present invention relates to an infrared ray detector of dual structure employing infrared ray detecting elements for detecting an intruder or the like.

2. Description of the Prior Art

In recent years, a pyroelectric infrared ray sensor has generally been employed as a detector for an intruder or the like since the same is easy to set and handle in comparison with an LED. The pyroelectric infrared ray sensor is generally formed by a pyroelectric member provided with electrodes on the front and back surfaces thereof and is excellent in sensitivity to slight temperature difference, whereas the same is liable to be affected by thermal noise and may be driven by a heat source such as a light of an automobile or an abrupt change in ambient temperature.

In order to prevent erroneous operation through such noise components other than the intruder, the so-called dual sensor device has been proposed and put into practice, in which oppositely polarized two pyroelectric infrared ray detecting elements are coupled in series or parallel with each other.

U.S. Pat. No. 3,839,640 discloses an example of such a dual sensor device.

This dual sensor device utilizes output of difference with signals obtained from two elements so that the two elements cancel influence through a temperature change simultaneously applied thereto or a change in ambient temperature, whereby no erroneous operation is caused by such external noise and the intruder can be stably detected.

FIG. 1 shows such a conventional dual sensor device. Referring to FIG. 1, first and second infrared ray detecting elements 1 and 2 are provided in a parallel manner in the vicinity of the focus F of a parabolic mirror 3. When a detected object moves from a point $\alpha$ to a point $\beta$ and then from the point $\beta$ to a point $\gamma$ at uniform velocity, the first infrared ray detecting element 1 generates an output signal a as shown in FIG. 2A during the movement from the point $\alpha$ to the point $\beta$, and the second infrared detecting element 2 generates an output signal b during the movement from the point $\beta$ to the point $\gamma$. The output of the difference between these two signals a and b is as shown in FIG. 2B, from which it is obvious that a large signal level can be obtained.

However, the output signal waveforms of FIGS. 2A and 2B merely show a case where only straight heat rays enter only a light receiving surface of the dual sensor device. However, in practice heat rays generally enter the device from every direction, and thus actual output signals are substantially as shown in FIG. 3A. FIG. 3A shows output signals a and b actually obtained from the infrared ray detecting elements 1 and 2 of the dual sensor device, and the difference between the output thereof is extremely lower in output level at its center c, as shown in FIG. 3B.

In a general infrared ray detector, a pyroelectric infrared ray sensor is inferior in input sensitivity and hence a large-dimensional concave parabolic mirror is employed. The infrared ray sensor is fixed in the vicinity of its focus thereby to improve the signal-to-noise ratio by increasing the amount of heat rays entering the infrared ray sensor. Thus, an infrared ray detector having an excellent signal-to-noise ratio is inevitably increased in size.

Another type of an infrared ray detector is provided with dividing segment spherical mirror means prepared by dividing a parabolic mirror into a plurality of sections, in order to detect objects such as intruders approaching from various directions. Also in this case, the divided mirror sections themselves are increased in size in order to retain output from the infrared ray sensor in an excellent signal-to-noise ratio, and hence the entire infrared ray detector is increased in size to remarkably restrict the position of installation.

In addition, an infrared ray detector is mainly directed to detect the intruder. The output from the infrared ray sensor following the intruder movement signal is in a frequency range of about 0.1 to 10 Hz. In a circuit for processing signals with such a low frequency range, the capacitor of a filter circuit is indispensably increased in capacitance which requires a large space, and hence it has been difficult to reduce the size of the infrared ray detector.

SUMMARY OF THE INVENTION

It is an object of the present invention to provide an infrared ray detector which can continuously obtain a large detection output with a sufficient signal-to-noise ratio during an intrusion.

In one aspect, the present invention is provided with an infrared ray detector which detects an intruder or the like by an output of a difference between two pyroelectric infrared ray detecting elements connected in a parallel or series manner with each other. The infrared ray detector comprises a pair of electrically connected pyroelectric infrared ray detecting elements having substantially identically directed light receiving surfaces and a shield means arranged in front of the light receiving surfaces to partially shield the infrared ray detecting elements against an incidence of infrared light. The shield means is arranged in a plane extending between the infrared ray detecting elements to separate the same on both sides thereof.

The term "shield means" not only indicates completely shielding the infrared ray detecting elements against the incident infrared light, but includes having a selective shielding property such as a filter transmitting only infrared light having a prescribed wavelength.

According to the present invention, the shield means is arranged in front of the light receiving surfaces of the pyroelectric infrared ray detecting elements, thereby to obtain sufficiently large detection output in the process of movement of a detected object in front of an intermediate portion between the infrared ray detecting elements.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 26 and 27 illustrate modifications of the embodiment as shown in FIG. 22, in which FIG. 26 is a plan view showing arrangement of infrared ray detecting elements and FIG. 27 shows arrangement of shield members.

DESCRIPTION OF THE PREFERRED EMBODIMENTS

Description is now made on preferred embodiments of the present invention with reference to the accompanying drawings.

Figure 4:
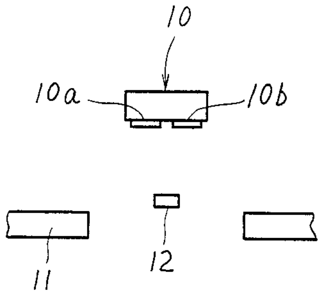
FIG. 4 typically illustrates an infrared ray detector according to a first embodiment of the present invention.

Referring to FIG. 4, a dual sensor device 10 is formed by a pyroelectric member provided with first and second infrared ray detecting elements 10*a* and 10*b*. An infrared ray transmission restricting panel 11 is arranged in front of a light receiving surface of the dual sensor device 10, and a differential signal auxiliary member 12 serving as a shield member is arranged substantially at the center of a transmission area (e.g., a hole) of the restricting panel 11. The differential signal auxiliary member 12 has such a characteristic of absorbing or reflecting infrared rays of 5 to 15 μm in wavelength radiated from an intruder, and the material therefor is appropriately selected from, e.g., plastic such as resin tape, metal and the like. Its size such as width is appropriately determined in consideration of the space between the two elements 10*a* and 10*b*, the distance for detecting an object such as an intruder, the size of the object and the like. The infrared transmission restricting panel 11 is formed by a panel member provided with an opening in an angular, circular or other shape for allowing an incidence of heat rays upon the dual sensor device 10.

Figure 1:
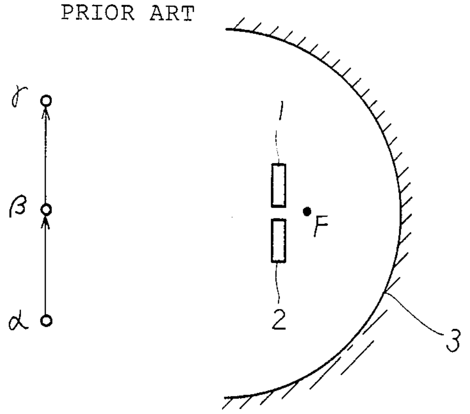
FIG.1 PRIOR ART
FIG. 1 is a sectional view showing the principle of a conventional infrared ray detector.
Figure 2A:
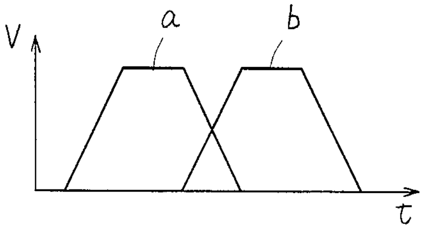
FIG.2A PRIOR ART
FIGS. 2A and 2B respectively illustrate output waveforms and output waveforms of difference with infrared ray detecting elements of the conventional infrared ray detector as shown in FIG. 1 in an ideal state.
Figure 3A:
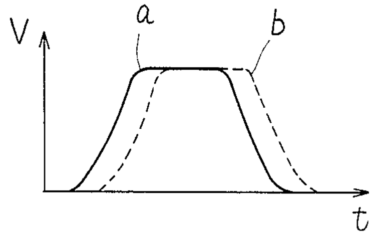
FIG.3A PRIOR ART
FIGS. 3A and 3B respectively illustrate output waveforms and output waveforms of a difference between the infrared ray detecting elements of the conventional infrared ray detector as shown and FIG. 1 in an actual operation state.
Figure 2B:
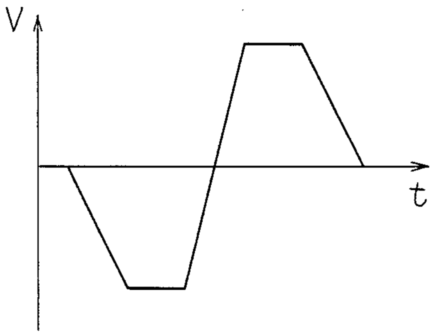
FIG.2B PRIOR ART
Figure 3B:
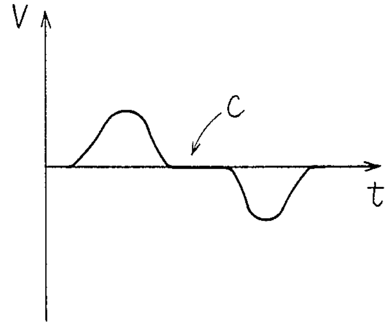
FIG.3B PRIOR ART
Figure 6A:
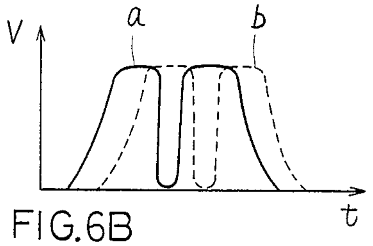
FIGS. 6A and 6B illustrate output waveforms and output waveforms of a difference between an infrared ray detecting elements in the embodiment as shown in FIG. 4.
Figure 6B:
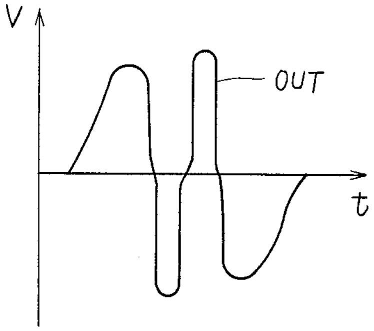

When, in the aforementioned structure, the detected object moves in front of the dual sensor device 10 at uniform velocity similarly to the case of FIG. 1, the first detecting element 10*a* generates an output signal a as shown in FIG. 6A and the second detecting element 10*b* generates an output signal b as shown therein through operation of the differential signal auxiliary member 12. Thus, the output of difference "OUT" (=a−b) of the two elements 10*a* and 10*b* is sufficiently high in the process of the movement of the object in front of the intermediate portion between the infrared ray detecting elements 10*a* and 10*b* as shown in FIG. 6B.

Figure 5:
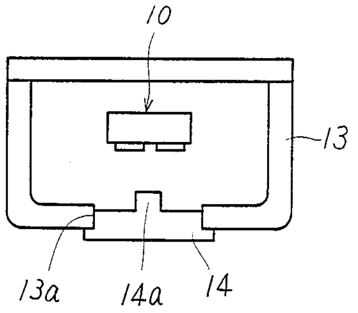
FIG. 5 illustrates a modification of the embodiment as shown in FIG. 4, in which a shield member is partially formed by a thick filter member.

FIG. 5 shows an exemplary construction of this embodiment. The dual sensor device 10 is contained in a case 13 having an opening 13*a*, which is provided with a filter 14 of infrared transmitting material such as polyethylene having a thick central portion 14*a*. This filter allows the radiated light having a wavelength on the order of 4.5 to 15 μm to pass. The thick central portion 14*a* serves as a differential signal auxiliary member, i.e., a shield member, while the peripheral portion of the opening 13*a* of the case 13 serves as an infrared transmission restricting panel.

Figure 7A:
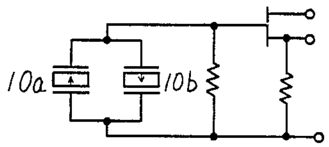
FIGS. 7A and 7B are equivalent circuit diagrams showing states of electric connection of the infrared ray detecting elements in the embodiment as shown in FIG. 4.
Figure 7B:
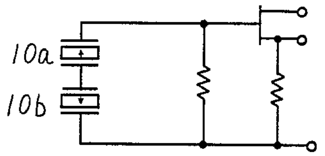

FIGS. 7A and 7B show manners of connection of the dual sensor device 10 as shown in FIGS. 4 and 5.

Japanese Patent Laying-Open Gazette No. 32131/1983 discloses an infrared ray detector employing a single type sensor in which two infrared transmission members provided with screen-shaped infrared non-transmission members are closely opposed to each other so that one of the same is vibrated. However, the infrared non-transmission members are not employed as auxiliary members for improving differential output as in the dual type sensor according to the present invention, but merely serve as choppers.

Further, Japanese Patent Publication Gazette No. 13449/1985 discloses an infrared ray detector applied to a multi-element infrared ray sensor array, in which an opening of a cold aperture is provided in the form of a lattice. In this infrared ray detector, views from respective infrared ray sensing elements are fixed to reduce output scattering of the elements, and the same is not provided with an auxiliary member for improving differential output such as that in the dual type sensor according to the present invention.

Description is now made on a second embodiment of the present invention, in which a mirror member reflecting infrared light is employed as shield means.

Figure 8:
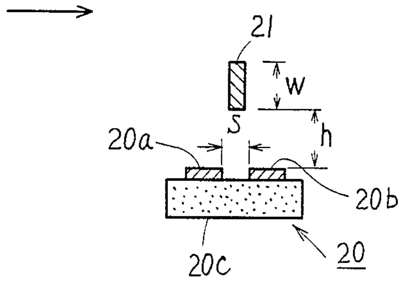
FIG. 8 is a sectional view showing a second embodiment of the present invention.

Referring to FIG. 8, an infrared ray sensor 20 according to this embodiment is in the so-called dual structure formed by a pyroelectric member 20*c* which is provided thereon with two infrared ray detecting elements 20*a* and 20*b*. At least one mirror member 21 is upwardly provided in the light receiving area of the infrared ray sensor 20. Namely, the mirror member 21 is arranged in a plane extending between the infrared ray detecting elements 20*a* and 20*b* to separate the same on both sides thereof. The mirror member 21 has reflective surfaces on both sides to reflect heat rays (far-infrared rays) radiated from a detected object, which heat rays are in turn incident upon the infrared ray detecting element 20*a* or 20*b*.

Figure 9:
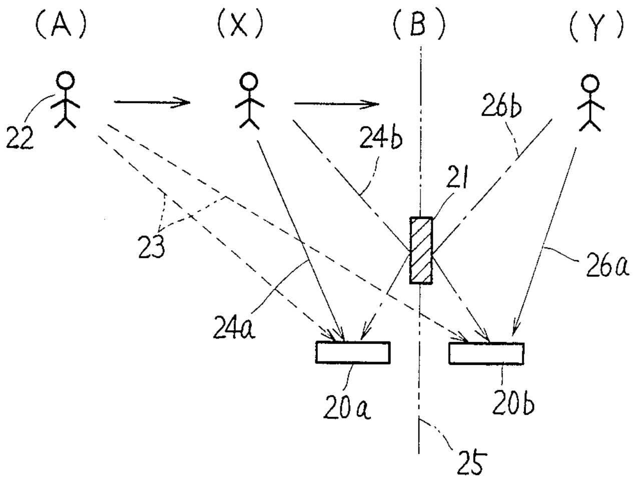
FIG. 9 typically illustrates the principle of measurement in the embodiment as shown in FIG. 8.

It is assumed here that the detected object moves in the arrow direction in parallel with the light receiving surface of the infrared ray sensor 20 at uniform velocity. Referring to FIG. 9, the infrared ray detecting elements 20*a* and 20*b* directly receive heat rays 23 radiated from an object 22 positioned in a point (A) separated from the infrared ray sensor 20. However, when the object 22 moves to a point (X) closer to the infrared ray sensor 20, the infrared ray detecting element 20*a* receives the heat rays in an amount 24*a* of direct incidence as well as an amount 24*b* reflected by the mirror member 21 while incidence of the heat rays is restricted or intercepted with respect to the other infrared ray detecting element 20*b*. When the object 22 moves to a point (B), both of the infrared ray detecting elements 20*a* and 20*b* directly receive the heat rays emitted from the object 22.

Figure 10:
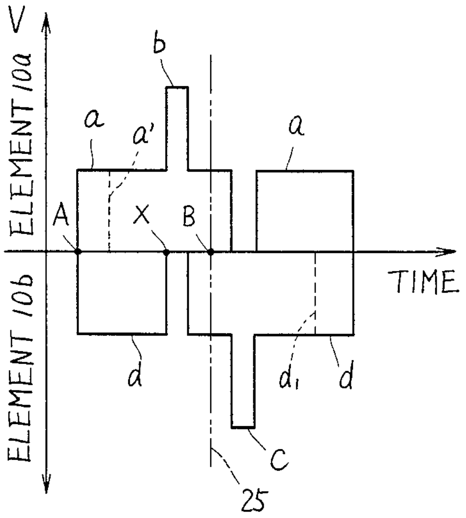
FIG. 10 illustrates output waveforms of the infrared ray detecting elements in the embodiment as shown in FIG. 8.
Figure 11:
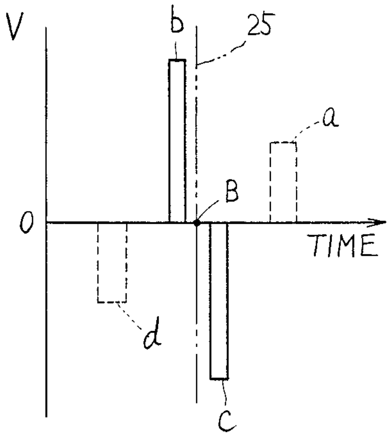
FIG. 11 illustrates output waveforms of a difference between the infrared ray detecting elements in the embodiment as shown in FIG. 8.

FIG. 10 conceptually shows output signals from the infrared ray detecting elements 20*a* and 20*b* in this case. Symbol a denotes output levels upon direct incidence of the heat rays and symbol b denotes an output level upon incidence of the amount 24*b* of heat rays reflected by the mirror member 21 on the infrared detecting element 20*a*. Thus, differential output from the infrared ray sensor 20, i.e., added output of the infrared ray detecting elements 20*a* and 20*b* connected in an opposite-polarity manner is as shown in FIG. 11, in which the output signal b with superpose of the amount 24*b* reflected by the mirror member 21 is approximately doubled in output level in comparison with the output signal a with only the amount of direct incidence and is at a high frequency level. The peak value of the output signal b depends on the reflection coefficient of the mirror member 21. Further, the pulse width of the output signal b depends on the height h of the mirror member 21, i.e., the distance from the light receiving surface, the width w of the mirror member 21 and the space s between the infrared ray detecting elements 20*a* and 20*b* as shown in FIG. 8. The space s is generally constant, and hence the height h and the width w of the mirror member 21 are appropriately determined in design. The width w of the mirror member 21 is so determined as to temporarily restrict, or preferably prevent incidence of the heat rays upon the infrared ray detecting elements 20*a* and 20*b*, and hence the mirror member 21 may be reduced in size. Dot lines $a^1$ and $d_1$ in FIG. 10 denote output levels in a case where difference phase is caused in the heat rays entering the infrared ray detecting elements 20*a* and 20*b* by the space s, and differential output levels in this case are shown by dot lines a and d in FIG. 11. Further, a two-dot chain line 25 denotes the plane separating the infrared ray detecting elements 20*a* and 20*b*. When the object 22 moves to a point (Y) beyond the plane 25, the infrared ray detecting element 20*b* receives an amount 26*a* of direct incidence in superpose with a reflected amount 26*b*. It is obviously understood from FIGS. 10 and 11 that the output levels are symmetrical with respect to a point (B) as the result.

Description is now made on definite structure of the second embodiment.

Figure 12:
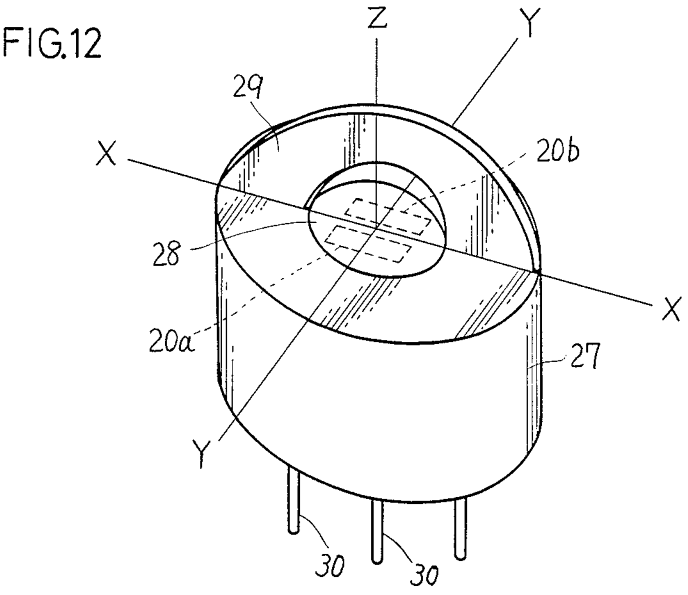
FIGS. 12 and 13 are perspective and sectional views for illustrating an exemplary construction of the embodiment as shown in FIG. 8.
Figure 13:
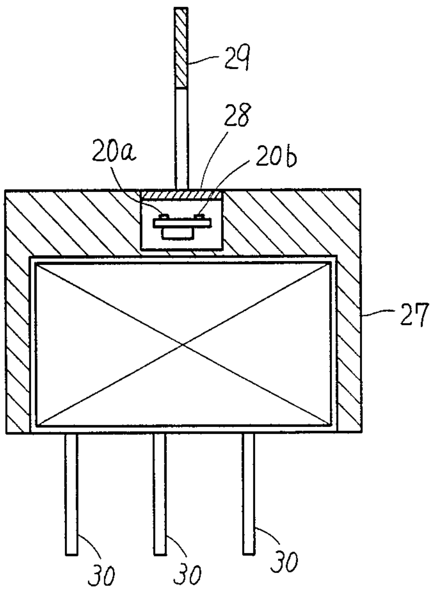

Referring to FIGS. 8, 12 and 13, an infrared ray sensor 20 of dual structure is formed by a pyroelectric member 20*c* provided thereon with two infrared ray detecting elements 20*a* and 20*b*. The back surface of the pyroelectric member 20*c* is fixed to a ceramic substrate (not shown) through an electrode, and the infrared ray sensor 20 is contained in a case 27 having an entrance window as shown in FIGS. 12 and 13. A U-shaped mirror member 29 is provided in a plane separating the two infrared ray detecting elements 20*a* and 20*b* across a light receiving surface 28 of the infrared ray detector 20. The mirror member 29 has optical reflective surfaces on both sides thereof, and is about 0.5 mm in thickness and about 6 to 7 mm in length (width) in a direction perpendicular to the light receiving surface 28. The case 27 is made of plastic, and contains an FET, a filter circuit and the like. Numeral 30 denotes terminals.

Figure 14:
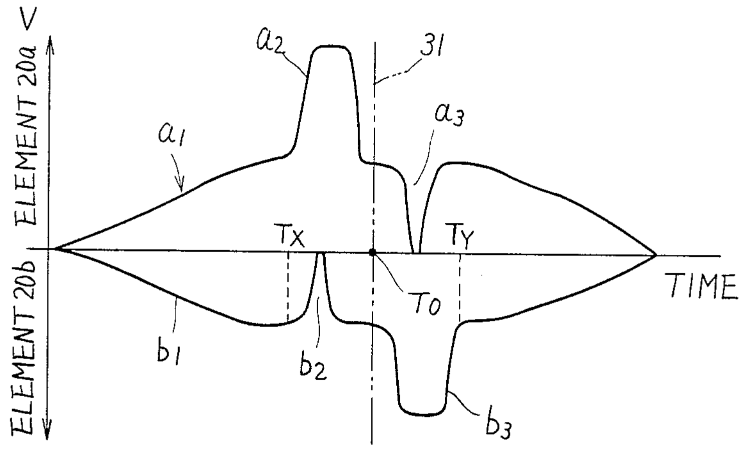
FIG. 14 illustrates output waveforms of the infrared ray detecting elements of the embodiment as shown in FIG. 8 in an actual operation state and FIG. 15 illustrates output waveforms of a difference between the infrared ray detecting elements.

The operation of this embodiment is now described with reference to FIGS. 9 and 14. When the intruder 22 approaches the infrared ray detecting element 20*a*, the infrared ray detecting elements 20*a* and 20*b* receive the heat rays 23 emitted from the intruder 22, thereby to develop smoothly increased output voltages $a_1$ and $b_1$ as shown in FIG. 14. When the intruder 22 reaches the point (X), the mirror member 21 (29) starts serving as a shield means for the infrared ray detecting member 20*b* with the intruder 22 along the arrow, whereby the infrared ray detecting element 20*b* is completely shielded against the heat rays and the output voltage thereof becomes zero as shown by $b_2$ in FIG. 14. At this point (X), on the other hand, the infrared ray detecting element 20*a* receives the heat rays in the amount 24*b* reflected by the mirror member 21 in addition to the amount 24*a* directly received from the intruder 22, and the total amount of heat rays entering the infrared ray detecting element 20*a* is substantially twice that of direct incidence. Thus, the output voltage developed in the infrared ray detecting element 20*a* is abruptly increased as shown by $a_2$ in FIG. 14. When the intruder 22 further moves along the arrow, the mirror member 21 (29) terminates reflection of the heat rays with respect to the infrared ray detecting element 20*a*. A two-dot chain line 31 in FIG. 14 indicates a case where the human body 22 is in a position right in front of the mirror member 21 (29), in which the heat rays are directly applied to the infrared ray detecting element 22*b*.

With further movement of the intruder 22, the infrared ray detecting element 20*a* is in turn shielded against the heat rays by the mirror member 21, (29) whereby its output voltage is abruptly lowered as shown by $a_3$ in FIG. 14. Thereafter the infrared ray detecting element 20*a* is released from the influence by the mirror member 21 (29) to again receive the heat rays directly from the intruder 22. On the other hand, the infrared ray detecting element 20*b* additionally receives the amount 26*b* of heat rays reflected by the mirror member 21 (29) with the movement of the intruder 22, whereby its output voltage is temporarily increased as shown by $b_3$ in FIG. 14.

Figure 15:
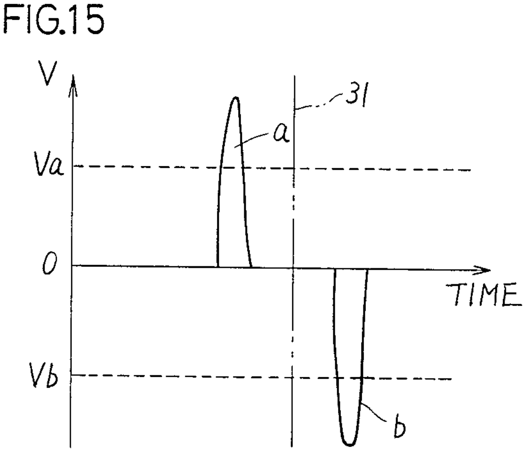

Thus, output obtained from the infrared ray sensor 20 appears as differential output of the output signals from the infrared ray detecting elements 20*a* and 20*b*, and hence pulse-like output signals a and b having high peak values are obtained as shown in FIG. 15. Since the mirror member 21 (29) exerts influence on the velocity of the intruder 22 for a short time, the output signals a and b are higher in frequency than output signals $V_a$ and $V_b$ with direct incidence of the heat rays.

Figure 16:
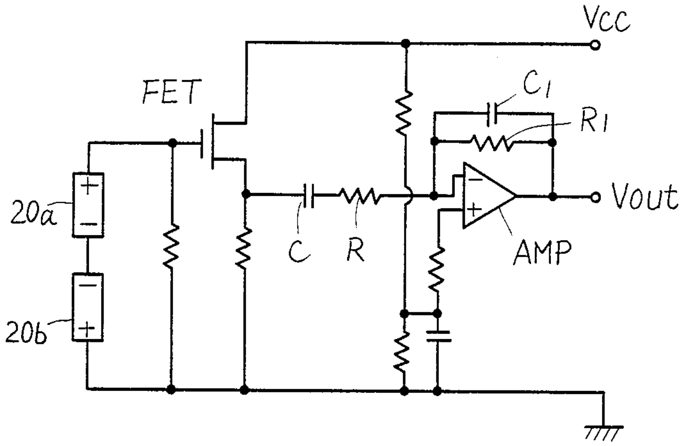
FIG. 16 is a circuit diagram showing an example of an amplification circuit contained in the embodiment of FIG. 8.
Figure 17:
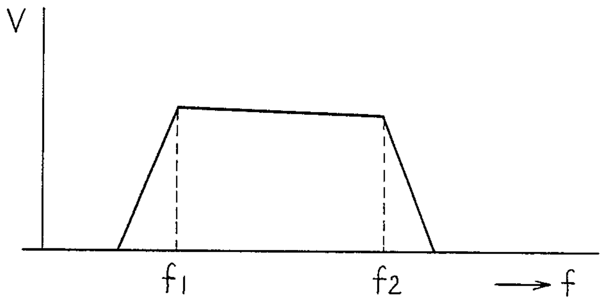
FIG. 17 illustrates the bandwidth of the amplification circuit as shown in FIG. 16.

FIG. 16 illustrates an example of an amplifier employed in the present invention and contained in the case 27. The infrared detecting elements (detectors) 20*a* and 20*b* are connected in series with each other in an opposite-polarity manner, and output signals thereof are supplied to an amplifier AMP through an impedance conversion circuit formed by a field-effect transistor (FET). An electrical active filter formed by a capacitor C and a resistor R is connected to the input part of the amplifier AMP, whose negative feedback circuit is formed by a capacitor $C_1$ and a resistor $R_1$. The amplifier AMP is so formed as to be in such bandwidth corresponding to the band of the signals obtained from the infrared ray sensor 20 as shown in FIG. 17. The lower cut-off frequency $f_1$ of the bandwidth is determined by the capacitor C and the resistor R, while the higher cut-off frequency $f_2$ is determined by the capacitor $C_1$ and the resistor $R_1$.

The output frequency of the infrared ray sensor according to this embodiment can be increased to about 10 Hz in comparison with the conventional case of about 1 Hz, and hence, e.g., the capacitor C for determining the lower cut-off frequency $f_1$ can be minimized to about 1/13 in volume ratio, whereby the intruder infrared ray detector can be remarkably reduced in size.

Figure 18:
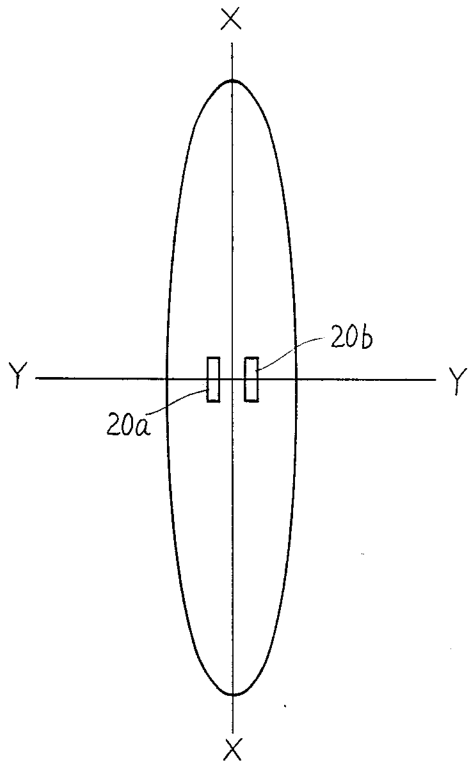
FIGS. 18 and 19 illustrates directivity of detection sensitivity of the embodiment as shown in FIG. 8, FIG. 18 showing that in an X-Y plane and FIG. 19 that in a Y-Z plane.
Figure 19:
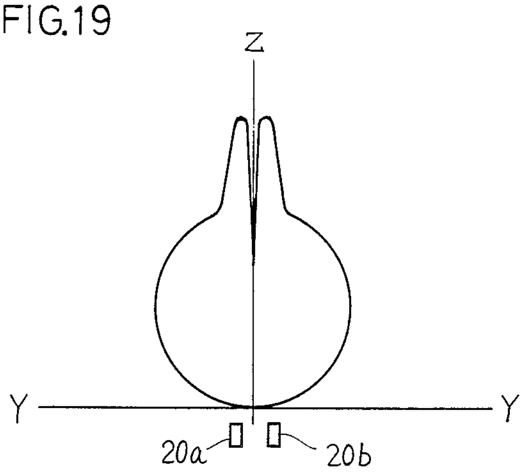

FIGS. 18 and 19 respectively illustrate directivity of a sensing region of the inventive infrared ray detector provided with the mirror member 29. With coordinates X, Y and Z axes as shown in FIG. 12, a sensing region in the plane of the X and Y axes is wider along the plan of the mirror member 29, i.e., along the X axis and narrower in the direction perpendicular to the plane of the mirror member 29, i.e., along the Y axis, as obvious from FIG. 18. On the other hand, a sensing region in the plane of the Y and Z axes protrudes in a direction perpendicular to the light receiving surface 28, i.e., along the Z axis as shown in FIG. 19. As hereinabove described, the sensing region has directivity by provision of the mirror member 29. Thus, the infrared ray detector according to the present invention may be mounted on, e.g., the ceiling of a passageway to provide a watching space across the detecting zone.

Figure 20:
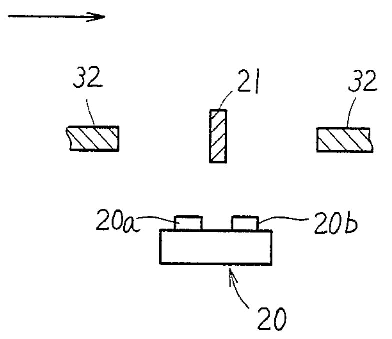
FIG. 20 illustrates a third embodiment of the present invention, in which an infrared ray transmission restricting member is provided in addition to the structure shown in FIG. 8.
Figure 21:
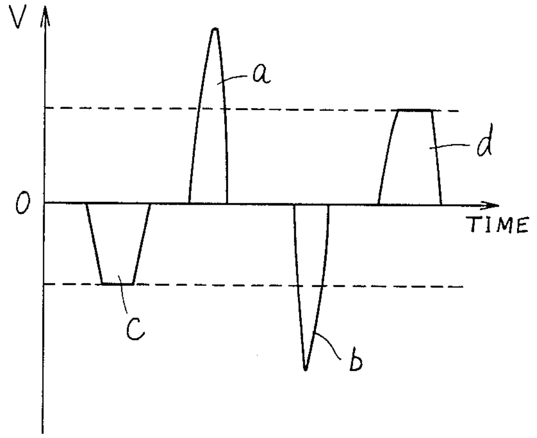
FIG. 21 illustrates output waveforms of a difference between the infrared ray detecting elements in the embodiment as shown in FIG. 20.

Although no light transmission restricting panel is provided in the light receiving area of the infrared sensor in the aforementioned embodiment, a light transmission restricting panel 32 as shown in FIG. 20 may be provided in the light receiving area. In this case, difference phase is caused by the gap between infrared ray detecting elements 20*a* and 20*b* upon incidence of heat rays. When, for example, a detected object moves along the arrow in FIG. 20, the infrared ray detecting element 20*b* develops an output signal in a phase delay to that of the infrared ray detecting element 20*a*, and differential output from the infrared ray sensor 20 includes signals c and d having low peak values and low frequency levels and signals a and b having high peak values and high frequency levels as shown in FIG. 21. The low-frequency signals c and d are removed by a band-pass filter as shown in FIG. 16, so that the high-frequency signals a and b are outputted from the infrared ray sensor 20.

Description is now made on a fourth embodiment of the present invention with reference to FIGS. 22 to 25. The fourth embodiment is a modification of the embodiment as shown in FIGS. 8 and 11, and is provided with a plurality of mirror members as shield members.

Figure 22:
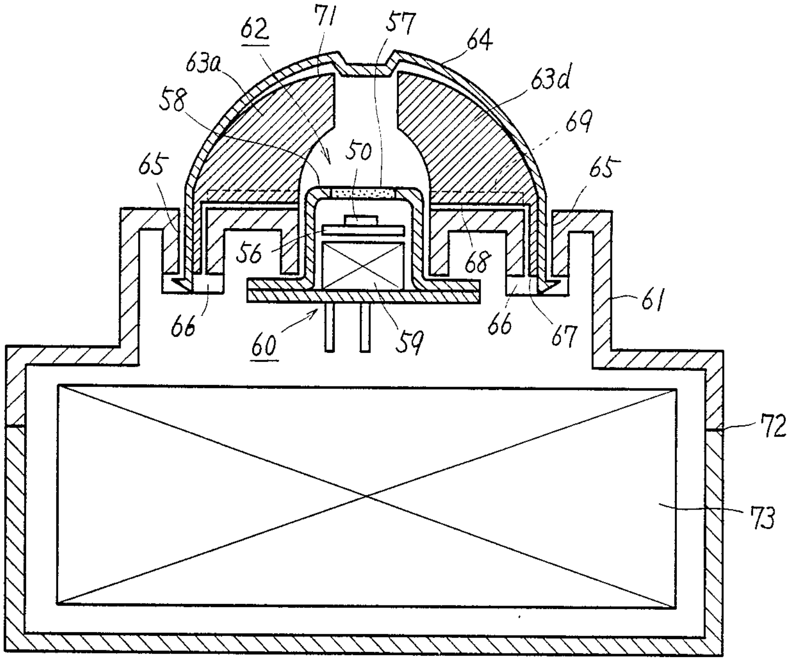
FIG. 22 is a sectional view showing an infrared ray detector according to a fourth embodiment of the present invention.

FIG. 22 is a sectional view showing the fourth embodiment. An infrared ray sensor 50 of dual structure is formed by a pyroelectric member provided thereon with two parallel-connected infrared ray detecting elements and fixed to one surface of a ceramic substrate 56, to be contained in a metal case 58 having an entrance window 57 sealed by window material. An impedance conversion circuit 59 is arranged on the other surface of the ceramic substrate 56, to provide an independent sensor portion 60 as a whole.

The sensor portion 60 is mounted in a central space 62 of a frame member 61 made of plastic, with the entrance window 57 directed to the exterior. Six mirror members 63 are upwardly provided at regular intervals along the central space 62, to be covered by a plastic cover 64.

Figure 23:
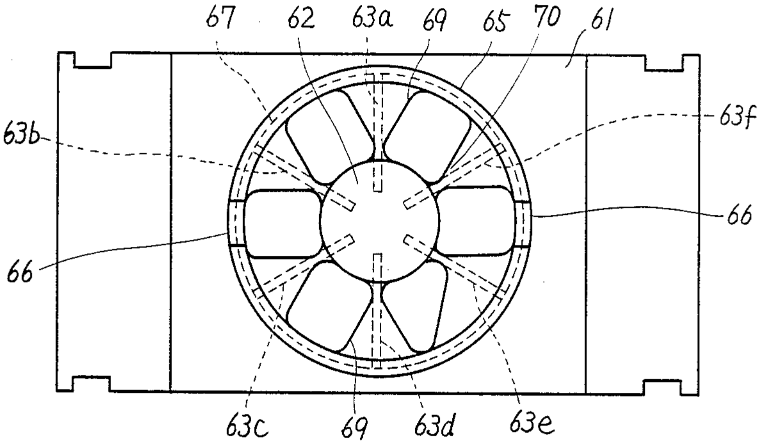
FIG. 23 is a plan view thereof.

In further detail with reference to FIG. 23, the frame member 61 is formed in the side provided with the mirror member 63, i.e., in the front surface thereof with a ring-shaped groove 65 concentric with the space 62, while through-holes 66 are provided in two portions of the bottom of the groove 65 oppositely through the space 62.

As shown by dot lines in FIG. 23, the mirror members 63 are partially integrally connected to a ring-shaped base portion 67 at the bottom sides thereof, to be directed to the center of the ring-shaped base portion 67. In such a state, the ring-shaped base portion 67 is inserted in the ring-shaped groove 65 of the frame member 61 so that bottom edges 68 of the mirror members 63 are placed in intervals 70 between respective protrusions 69 to fix the spaces therebetween. The size of each mirror member 63 in the central direction is selected to be in such length that its forward end portion protrudes in the central space 62 of the frame member 61 not to reach the center thereof, e.g., 6 to 10 mm. Further, each mirror member 63 has an arcuate outer edge 71, whose height is about 5 to 12 mm. This mirror member 63 is prepared by pressing or bending metal such as iron, nickel and phosphor bronze, and both surfaces thereof are specularly worked by plating, evaporating or sputtering of chromium, aluminum or the like to provide optical reflective surfaces reflecting the light having the wavelength of 5–10 $\mu$m, which are about 0.1 to 0.5 mm in thickness.

The plastic cover 64 is prepared by infrared transparent material such as polyethylene resin which transmits infrared rays of 5 to 10 $\mu$m in wavelength emitted from an intruder, and its thickness is about 0.5 mm.

The frame member 61 can be divided into two parts along a mating face 72, and is provided therein with a circuit 73 for processing signals detected by the infrared ray sensor 50. This circuit 73 is formed by an electrical active filter circuit and an amplifier similarly to the circuit as shown in FIG. 16, and may contain a DC power supply circuit, AC power rectifying circuit, a DC amplifier, a comparator, a converter and the like at need.

Figure 24:
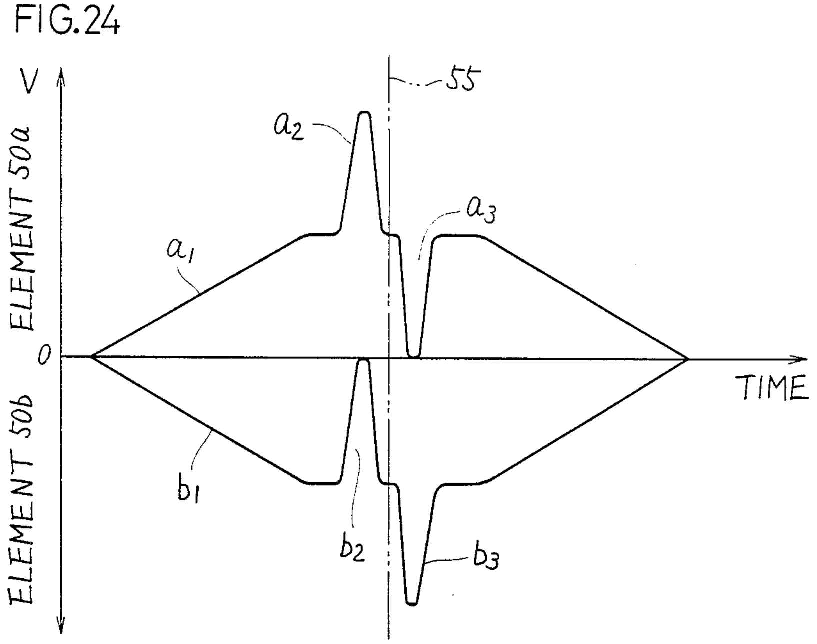
FIG. 24 illustrates output waveforms of infrared ray detecting elements in the embodiment as shown in FIG. 23 in an actual operation state.

FIG. 24 shows actual output V from the infrared ray detecting elements 50*a* and 50*b* in this embodiment. Assuming that an intruder perpendicularly approaches a plane of a specific mirror member at uniform velocity to pass the same, the heat rays emitted from the intruder straightly and simultaneously apply the infrared ray detecting elements 50*a* and 50*b* from a point separated from the infrared ray sensor 50. Therefore, output voltages $a_1$ and $a_2$ of the infrared ray detecting elements 50*a* and 50*b* are smoothly increased with approach of the intruder to reach saturation points. With further approach of the intruder, the mirror member serves as a thermal shield to one of the infrared ray detecting elements 50*a* and 50*b* to completely shield the same against the heat rays emitted from the intruder, whereby the output level of the infrared ray detecting element becomes zero as shown by $b_2$. At this time, the other infrared ray detecting element receives the heat rays reflected by the mirror member in addition to those directly emitted from the intruder, and the amount of the heat rays as received is substantially twice that of direct incidence. Thus, the output voltage $a_2$ of the other infrared ray detecting element is abruptly increased. With further movement of the intruder, both of the infrared ray detecting elements receive only heat rays directly emitted from the intruder. The two-dot chain line 55 denotes such case where the intruder moves to a point directly in front of the mirror member. With further movement of the intruder, the other infrared detecting ray element is in turn shielded by the mirror member to form a trough $a_3$ and a peak $b_3$.

The output from the infrared ray sensor 50 appears as the differential output of the infrared ray detecting elements 50*a* and 50*b*, to provide pulse-like output voltages b and c higher in peak value than output voltages a and d with only direct incidence of heat rays, similarly to the case shown in FIG. 11. Further, the output voltages b and c are at high frequency levels since the mirror members exert influence on the velocity of movement of the intruder for a short time.

Figure 25:
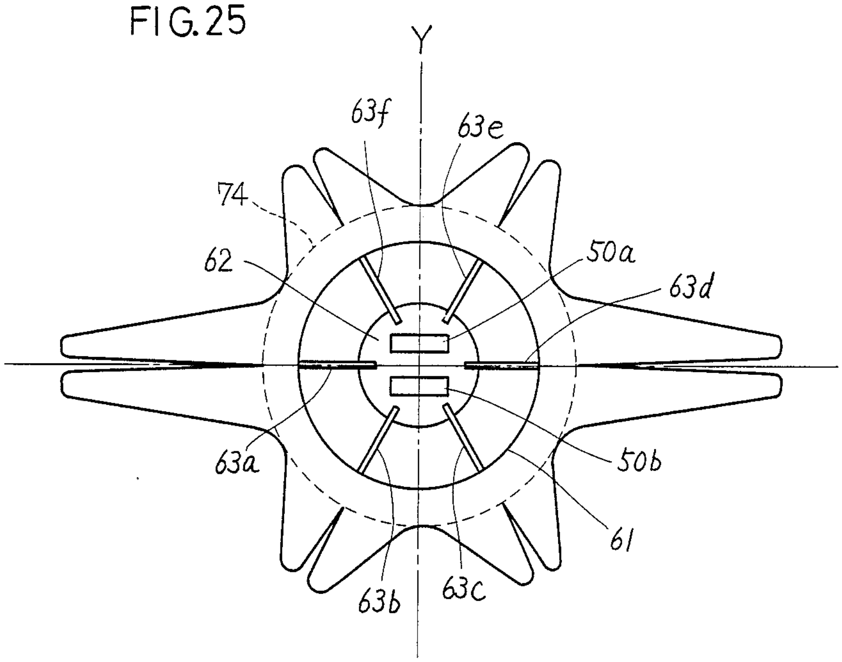
FIG. 25 illustrates directivity of detection sensitivity of the embodiment as shown in FIG. 22.
Figure 26:
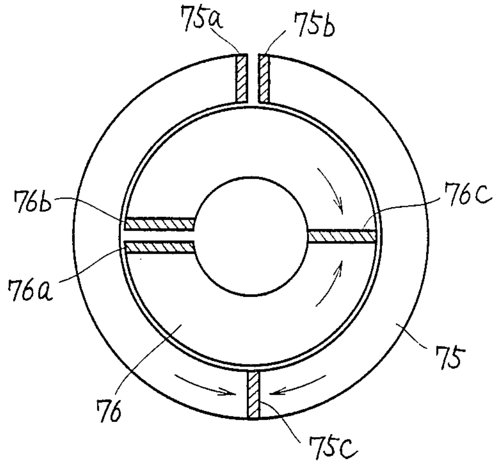

As shown in FIG. 23, this embodiment employs six mirror members 63*a* to 63*f* each having the aforementioned function. The sensing region in this case is remarkably enlarged in comparison with a sensing region 74 with no mirror member provided, on a plane formed by an X axis in the horizontal direction of FIG. 22 and a Y axis perpendicular thereto in the plane direction of the mirror members 63*a* to 63*f* as shown in FIG. 25, with the so-called directivity. The reflecting functions of the mirror members are particularly remarkable in the direction of the plane separating the two infrared ray detecting elements 50*a* and 50*b*, i.e., on the X axis.

Although the six mirror members are provided along the central hole 62 of the frame member 61 in the aforementioned embodiment, the number of the mirror members and the relation therebetween are not restricted to the same. For example, the mirror members 63*e* and 63*f* in FIG. 25 may be removed so that sensitivity is lowered in the upper portion in the drawing. Or, the mirror members 63*b* and 63*e* may be removed to retain sensitivity in a biased direction. Further, although the angle between each adjacent pair of the mirror members 63*a* to 63*f* is 60° in FIG. 23, the angle between, e.g., the mirror members 63*b* and 63*c* may be 120°. In other words, the number of and the angle between the mirror members in this embodiment can be freely determined in design.

When the two infrared detecting elements 50*a* and 50*b* are arranged in a parallel manner, the sensing region is remarkably extended along the X axis while the same is not much extended in other directions as obvious from FIG. 25. This is because the amount of reflected light is decreased by the angles of arrangement of the mirror members 63*b*, 63*c*, 63*e* and 63*f*. Provided in such case are circular three-terminal infrared ray detecting elements 75 and 76 each comprising two series-connected infrared ray detecting elements in a concentric manner while electrodes 75*a*, 75*b*, 76*a* and 76*b* on both ends are displaced by 90° in position. The infrared ray detecting elements 75 and 76 are substantially identical in area so as to generate identical output signals upon incidence of the same amount of heat rays. Further, the infrared ray detecting elements 75 and 76 are polarized in the directions of the electrodes 75*c* and 76*c* in both side portions thereof as shown by arrows, while these infrared ray detecting elements 75 and 76 are connected in a parallel manner to, e.g., the impedance conversion circuit as shown in FIG. 7A.

Figure 27:
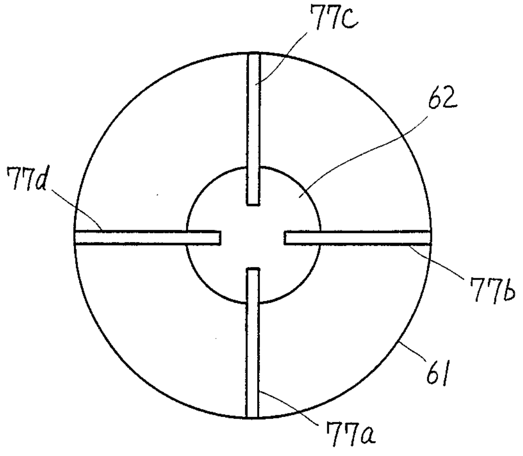

With the aforementioned structure of the infrared sensor, the sensing region can be prevented from extension in a specific direction (along X axis) as shown in FIG. 25, so that the sensing region can be made substantially even along the plane direction of crosswisely arranged mirror members 77*a* to 77*d* as shown in FIG. 27. Such an infrared ray sensor is effectively mounted on, e.g., the ceiling of a diverging point of a detecting zone.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An infrared ray detector of dual structure having two electrically connected pyroelectric infrared ray detecting elements, said infrared ray detector comprising:

a pair of pyroelectric infrared ray detecting elements having substantially identically directed light receiving surfaces, said pair of detecting elements having opposite polarities and being electrically connected with each other to generate an output signal representing the difference therebetween; and a mirror means being spaced a predetermined distance in front of said light receiving surfaces, said mirror means having a predetermined width, said predetermined distance and predetermined width restricting an incident infrared light ray on one of said pair of detecting elements while another of said pair of detecting elements receives said incident infrared light ray directly on the light receiving surface and also receives a reflected infrared light ray from said mirror means.

2. An infrared ray detector in accordance with claim 1, wherein said mirror means is arranged in a plane extending between said infrared ray detecting elements to separate the same on both sides thereof.

3. An infrared ray detector in accordance with claim 2, wherein said mirror means is provided with reflective surfaces on both sides thereof.

4. An infrared ray detector in accordance with claim 3, wherein a plurality of said mirror means are provided such that one of said mirror means is arranged in a plane extending between said infrared ray detecting elements to separate the same on both sides thereof.

5. An infrared ray detector in accordance with claim 4, wherein said mirror means are sector-shaped panel members recessed at central portions thereof.

6. An infrared ray detector in accordance with claim 3, wherein said mirror means is a sector-shaped panel member recessed at its central portion.

7. An infrared ray detector according to claim 1 further comprising a frame member having a processing circuit for processing signals, a ring-shaped groove in a surface thereof and a central space in a center thereof, a sensor portion being provided in said central space, said mirror means having a base portion inserted into said ring-shaped groove and said mirror means being a plurality of mirrors integrally connected to said groove, said mirrors being provided in planes which contain a center line and not touch each other, and a cover being transparent and covering said mirror means.

8. An infrared ray detector according to claim 7 wherein said processing circuit comprises a bypass filter, an amplifier and a low pass filter having a capacitor and a resistor as a negative feedback circuit, and is provided as a band pass filter filtering an output from the infrared ray detecting elements.

9. An infrared ray detector according to claim 1 wherein said pair of detecting elements are circular three-terminal infrared ray detecting elements, each detecting element comprising two series-connected infrared ray detecting elements in a concentric manner and having electrodes arranged on both ends being displaced 90° from each other, said detecting elements being polarized in the directions of the electrodes on both side portions thereof and being connected in a parallel manner.

10. An infrared ray detector of dual structure having two electrically connected pyroelectric infrared ray detecting elements, said infrared ray detector comprising:

a sensor portion having a pair of pyroelectric infrared ray detecting elements having substantially identically directed light receiving surfaces, said pair of detecting elements having opposite polarities and being electrically connected with each other to generate an output signal representing the difference therebetween, a ceramic substrate having front and rear surfaces, said pair of detecting elements being fixed to said front surface of said ceramic substrate, a metal case having an entrance window, and a impedance circuit arranged on said rear surface of said ceramic substrate;

a frame member having a central space, said sensor portion being mounted in said central space with said entrance window directed to an exterior of said frame member, said frame member having a processing circuit for processing signals determined by said sensor portion;

mirror means being spaced a predetermined distance in front of said light receiving surfaces of said pair of detecting elements, said mirror means having a predetermined width, said predetermined distance and predetermined width of said mirror means restricting an incident infrared light ray on one of said pair of detecting elements while another of said pair of detecting elements receives said incident infrared light ray directly on the light receiving surface and also receives a reflected infrared light ray from said mirror means, said mirror means including a plurality of mirrors being provided at predetermined intervals along said central space of said frame member; and cover member for covering said mirror means.

11. An infrared ray detector according to claim 10 wherein said frame member has a ring-shaped groove concentric with said central space, said frame member having opposed through-holes provided at two positions in a bottom of said ring-shaped groove.

12. An infrared ray detector according to claim 11 wherein a bottom of said mirror means is connected to a ring-shaped base portion, said ring-shaped base portion being inserted in said ring-shaped groove of said frame member.

13. An infrared ray detector according to claim 10 wherein said cover member is of a transparent material which transmits infrared rays.

14. An infrared ray detector according to claim 10 wherein said processing circuit comprises a bypass filter, an amplifier and a low pass filter having a capacitor and a resistor as a negative feedback circuit, and is provided as a band pass filter filtering an output from the infrared ray detecting elements.

15. An infrared ray detector according to claim 10 wherein said plurality of mirrors is six.

16. An infrared ray detector according to claim 10 wherein an angle between said plurality of mirrors is 60°.

17. An infrared ray detector according to claim 10 wherein an angle between said plurality of mirrors is 120°.

18. An infrared ray detector according to claim 10 wherein said plurality of mirrors are four and are arranged crosswise from one another at an angle of 90°.

19. An infrared ray detector according to claim 10 wherein said pair of detecting elements are circular three-terminal infrared ray detecting elements, each detecting element comprising two series-connected infrared ray detecting elements in a concentric manner and having electrodes arranged on both ends being displaced 90° from each other, said detecting elements being polarized in the directions of the electrodes on both side portions thereof and being connected in a parallel manner.

* * * * *